US009836330B2

United States Patent
Chen et al.

(10) Patent No.: US 9,836,330 B2
(45) Date of Patent: Dec. 5, 2017

(54) VIRTUAL RESOURCE MANAGEMENT TOOL FOR CLOUD COMPUTING SERVICE

(71) Applicant: Hitachi, Ltd, Tokyo (JP)

(72) Inventors: Heming Chen, Novi, MI (US); Donald J. McCune, Farmington Hills, MI (US); Sujit Phatak, Farmington Hills, MI (US); Can Wang, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 13/943,378

(22) Filed: Jul. 16, 2013

(65) Prior Publication Data

US 2015/0026342 A1    Jan. 22, 2015

(51) Int. Cl.
*G06F 15/173* (2006.01)
*G06F 9/50* (2006.01)

(52) U.S. Cl.
CPC ...... *G06F 9/5055* (2013.01); *G06F 2209/503* (2013.01); *G06F 2209/504* (2013.01); *Y02B 60/142* (2013.01)

(58) Field of Classification Search
CPC ........... H04L 47/70; G06F 9/50; G06F 3/0631
USPC .................................................. 709/223, 226
See application file for complete search history.

(56) References Cited

U.S. PATENT DOCUMENTS

| | | | |
|---|---|---|---|
| 2006/0271700 A1 | 11/2006 | Kawai et al. | |
| 2007/0110094 A1 | 5/2007 | Tobita et al. | |
| 2008/0109813 A1 | 5/2008 | Narita et al. | |
| 2011/0022812 A1* | 1/2011 | van der Linden | .... G06F 9/5077 711/163 |
| 2012/0060167 A1* | 3/2012 | Salsburg | .................. G06F 9/50 718/104 |
| 2012/0331152 A1* | 12/2012 | Tatsubori | ............. G06F 9/5027 709/226 |

* cited by examiner

*Primary Examiner* — Wing F Chan
*Assistant Examiner* — Andrew Woo
(74) *Attorney, Agent, or Firm* — Mattingly & Malur, PC (57) ABSTRACT

A system and method for allocating software resources. Multiple tasks are received from a network in which each task requires at least one software resource. Each task is analyzed to determine the type of resource(s) required to execute each such task. The availability of the software resource(s) is determined and, if available, allocated to the requesting task. If the software resource(s) is not available, the task is stored in a queue until the software resource(s) becomes available.

6 Claims, 8 Drawing Sheets

| ID | Process ID | Type | Load | VM ID | Max Software License |
|---|---|---|---|---|---|
| 1 | 1 | A | 15 | Not Allocated | 2 |
| | 2 | B | 8 | Not Allocated | 1 |
| | 3 | B | 10 | Not Allocated | |
| | 4 | C | 25 | Not Allocated | 1 |
| | 5 | D | 30 | Not Allocated | 1 |

Task Before Consolidation

*Fig-14A*

| ID | Process ID | Type | Load | VM ID | Max Software License |
|---|---|---|---|---|---|
| 1 | 1 | A | 15 | 1 | 2 |
| | 2&3 | B | 8+10 | 2 | 1 |
| | 4 | C | 25 | 3 | 1 |
| | 5 | D | 30 | 4 | 1 |

Task After Consolidation

*Fig-14B*

| ID | Category | Total | Reserved | Allocated | Available | |
|---|---|---|---|---|---|---|
| | CPU | 100 | 15 | 40 | 45 | — 107 |
| 1 | RAM | 1000 | 200 | 400 | 400 | |
| | HDD | 10000 | 1000 | 5000 | 4000 | |
| | | | | | | |

Hardware

*Fig-15A*

| ID | Category | Total | Reserved | Allocated | Available | |
|---|---|---|---|---|---|---|
| | A | 200 | 25 | 25 | 150 | — 109 |
| 1 | B | 1000 | 100 | 400 | 500 | |
| | C | 300 | 100 | 50 | 150 | |
| | | | | | | |

Software

*Fig-15B*

VIRTUAL RESOURCE MANAGEMENT TOOL FOR CLOUD COMPUTING SERVICE

BACKGROUND OF THE INVENTION

I. Field of the Invention

The present invention relates to a method and system for allocating software resources in a multiuser system.

II. Description of Related Art

When conducting a computational task on a multiuser system, such as a cluster or cloud server, oftentimes many processes must run simultaneously. Each process, furthermore, usually requires a copy of a particular software so that it can execute such a process. For example, in a multiuser system involving automotive modeling, a single computational process may require use of a copy of several different software resources.

Furthermore, in order to execute certain tasks, it is often necessary to use several copies of the same software resource. For example, in the automotive industry a fairly complex simulation may require multiple copies of several different software resources.

Currently, virtualization technology in the computer industry allows several servers to migrate into virtual machines and be consolidated into one physical server. However, the requirement for software does not change. Instead, each virtual machine still needs a valid copy of each software resource which is necessary to execute each task.

There have been previously known attempts to locate and allocate different software resources in a network. However, these previously known systems all assume that the amount of hardware and software resources was unlimited. However, no service provider can actually provide unlimited software resources for many reasons, including economic reasons. Furthermore, none of these previously known allocation systems have made any attempt to consolidate software resources required by the particular task thus resulting in inefficient use of the software resources.

SUMMARY OF THE PRESENT INVENTION

The present invention provides both a method and a system for allocating software resources in a multiuser network which overcomes the above mentioned disadvantages of the previously known method and systems.

In brief, in the present invention tasks are received from a network. Each task that is received requires at least one, and oftentimes many, software resources.

Each task is analyzed to determine the type and number of software resources required to execute that task.

The availability of the identified software resources is then determined and, if available, allocated to the task requesting the software resources. Conversely, if the software resources for a particular task are unavailable, the task is placed into a waiting queue for a period of time. Thereafter, the availability of the resources required by that particular task is determined until the required resources are found and allocated.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
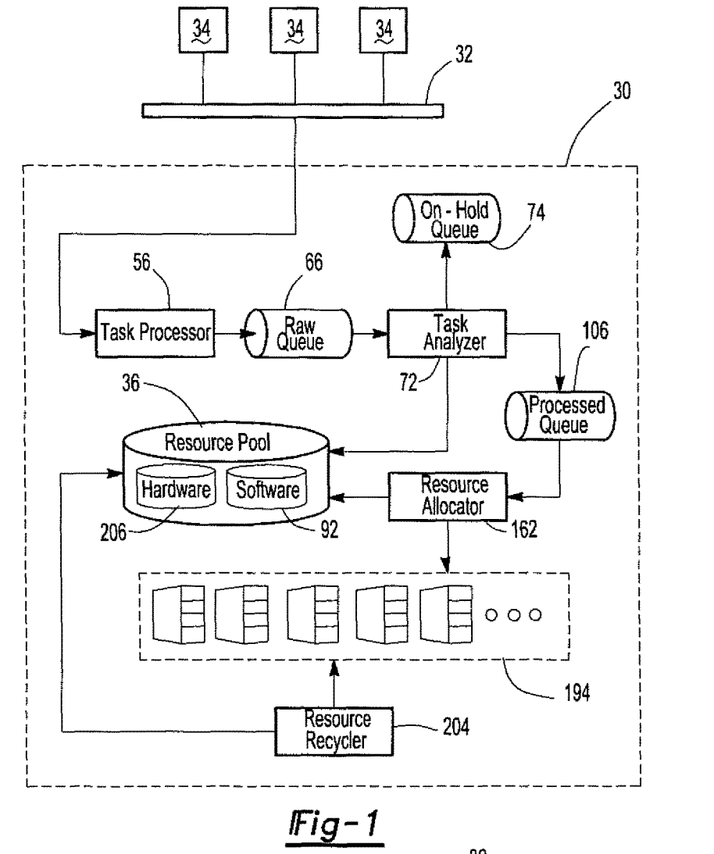
FIG. 1 is an overview of an entire virtual resource management system in accordance with a preferred embodiment of the present invention.

With reference first to FIG. 1, a block diagrammatic view of the software resource management system 30 according to the present invention is shown. The system 30 is electronically connected to a computer network 32 which may be accessed by multiple users 34. Consequently, the users 34 of the network 32 submit various tasks to the system 30 for execution by software accessible to the system 30.

Figure 2:
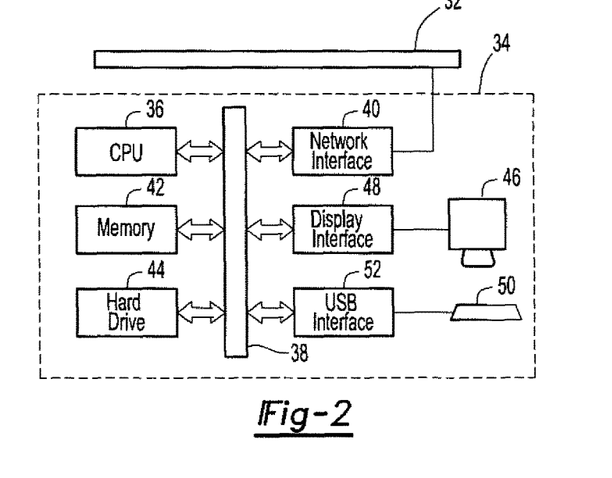
FIG. 2 is a block diagram of an example of a client system.

With reference now to FIG. 2, the user or client system 34 typically includes a processing unit 36 which communicates with the network 32 through a client bus 38 and network interface 40. Random access memory 42 as well as persistent memory 44, such as a hard drive, is also connected to the bus 38.

An output device 46, such as a monitor, is connected to the client bus 38 through a display interface 48. Similarly, an input device 50, such as a keyboard, is also connected to the client bus 38.

In practice, the user or client 34 creates a task, such as an automotive simulation, and submits that task to the system 30 through network interface 40. The task submitted to the system 30 requires at least one, and oftentimes more software resources in order to execute or perform the task. In some cases, multiple copies of the same software resource are necessary to perform the submitted task. Regardless of the number of software resources necessary to perform the task, once created by the user on client 34, tasks are transmitted to the resource management system 30 through the network interface 40.

Figure 3:
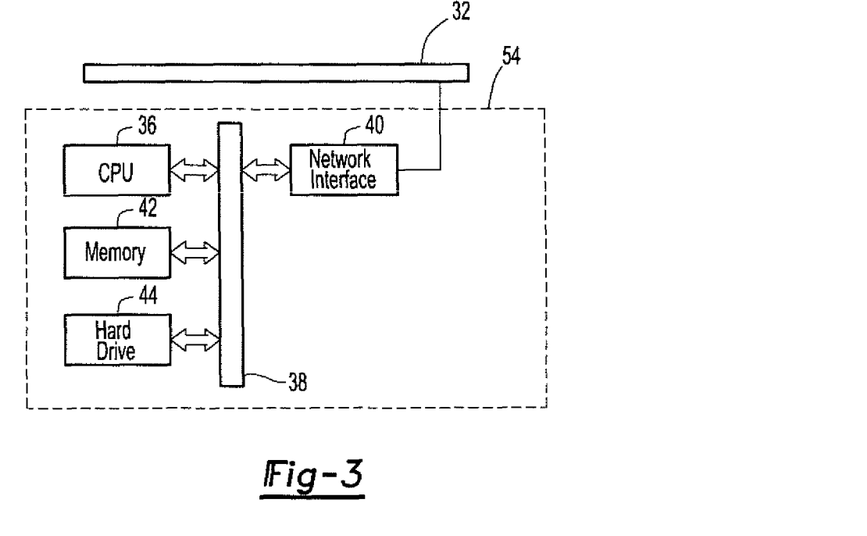
FIG. 3 is a block diagram of an example of a server system.

With reference to FIG. 3, in lieu of the client system 34, a server 54 may communicate with the network 32 in order to perform or execute user submitted tasks requiring one or more software resources. In the resource management system 30, multiple servers 54 may exist as virtual machines managed as a fleet 194, or management servers performing other jobs such as task analyzing, etc. Because human users do not physically interact with it, the server 54 differs from the client system 34 in that the server 54 does not include either the output device 46, input device 50, or their respective interfaces. Otherwise, the description of the client system shown in FIG. 2 is equally applicable to FIG. 3 and incorporated by reference.

Figure 7:
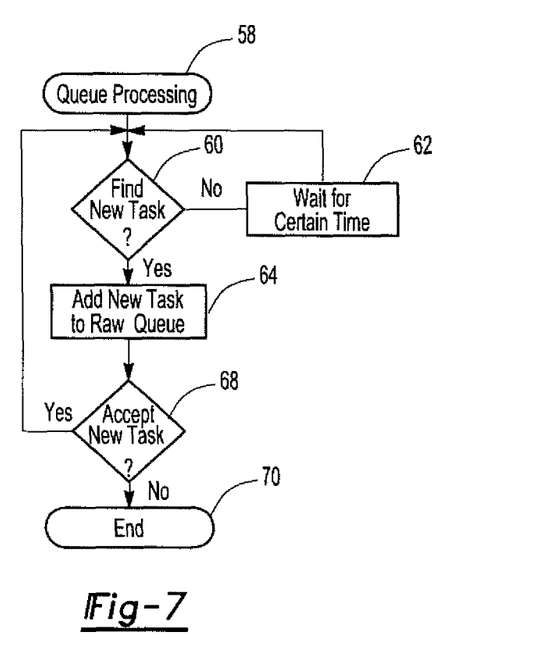
FIG. 7 is a flowchart of raw queue processing.

With reference now to FIGS. 1 and 7, all of the tasks received by the resource management system 30 are first processed using a task processor 56. A flowchart illustrating the operation of the task processor 56 is shown in FIG. 7.

After initiation of the task processor 56 at step 58, 58 proceeds to step 60. At step 60, the processor for the resource management system 30 determines if a new task has been received from the network 32. If not, step 60 branches to step 62 and delays for a certain period of time, e.g. a few milliseconds. Step 62 then proceeds back to step 60 where the above process is reiterated until a new task is received from the network 32. In that case, step 60 proceeds to step 64.

At step 64, the management system 30 adds the newly received task to a raw, i.e. unprocessed, queue 66 (FIG. 1). Step 64 then proceeds to step 68.

Step 68 determines whether or not the newly received process will be accepted by the system 30, i.e. the usual case. In that event, step 68 proceeds back to step 60 where the above described process is repeated for the next received task from the network 32. Otherwise, step 68 exits at step 70.

Figures 8, 9:
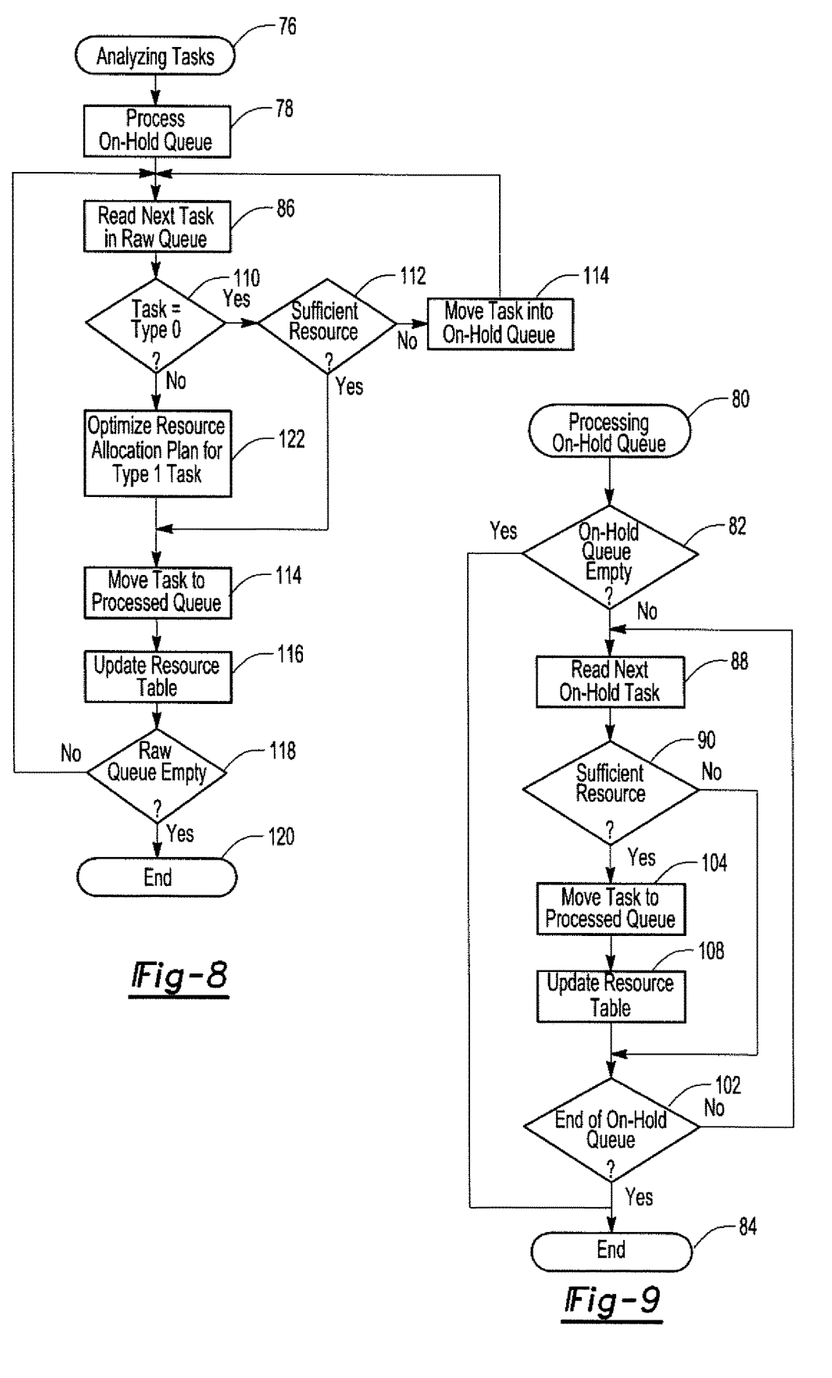
FIG. 8 is a flowchart of task analyzing.
FIG. 9 is a flowchart of on-hold queue processing.

With reference now to FIGS. 1, 8, and 9, a task analyzer 72 analyzes the resource requirement of each task in raw queue 66 and stores it in on-hold queue if there are not sufficient software resources. Tasks with guaranteed software resource allocations are moved into processed queue 106. After initiation of the task analyzer 72 at step 76 (FIG. 8), step 76 proceeds to step 78 which first processes tasks that are stored in the on-hold queue 74.

FIG. 9 illustrates a flowchart for processing the on-hold queue 74 by the task analyzer 72. After initialization at step 80, step 80 proceeds to step 82 which determines if the on-hold queue is empty. If so, step 82 exits the on-hold queue processing at step 84 and proceeds to step 86 (FIG. 8).

However, if the on-hold queue is not empty, step 82 instead proceeds to step 88 which reads or inputs the next task stored in the on-hold queue. Step 88 then proceeds to step 90.

Figure 5:
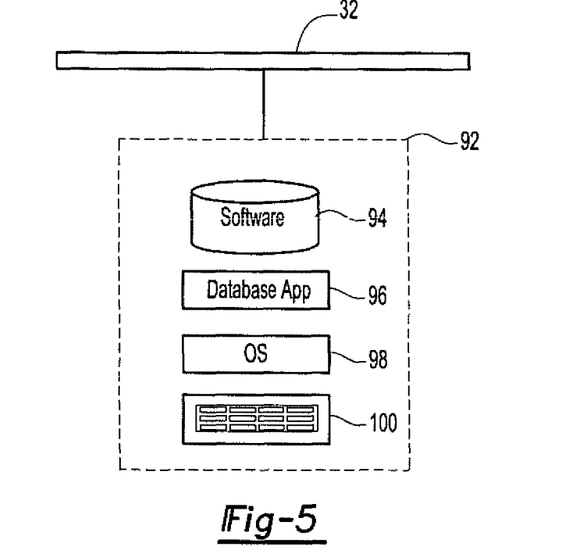
FIG. 5 is a block diagram of the software resource server.

With reference to FIGS. 5 and 9, step 90 first determines if there is sufficient software resources available to the management system 30 necessary to perform the task obtained at step 88. In order to make this determination, the task analyzer 72 (FIG. 1) communicates with a software resource server 92. As best shown in FIG. 5, the software resource server 92 includes a software database 94 and a database application 96 which accesses the software database 94. The database application 96 itself operates under control of an operating system 98 and the software resource server 92 communicates with the network 32 through a physical server 100.

Still referring to FIGS. 1, 5, and 9, step 90 communicates with the software resource server 92 to determine if there are sufficient software resources available to perform the task obtained at step 88. If not, step 90 proceeds to step 102 which determines if the on-hold queue 74 (FIG. 1) is empty. If so, step 102 exits at step 84 and, if not, step 102 branches back to step 88 to perform the above identified process.

Conversely, if sufficient resources are available to perform the task, step 90 (FIG. 9) instead proceeds to step 104 and moves the step from the on-hold queue 74 to a processed queue 106 (FIG. 1). Step 104 then proceeds to step 108.

At step 108 the task analyzer 72 communicates with the software resource server 92 (FIG. 5) to update a software resource availability table by removing or subtracting the software resources assigned to the task obtained at step 88. Step 108 then proceeds to step 102 where the above process is repeated until the on-hold queue is processed in this iteration.

With reference now to FIGS. 1 and 8, after all the tasks in the on-hold queue have been processed as described and step 78 proceeds to step 86, step 86 reads in the next task from the raw queue 66. Step 86 then proceeds to step 110.

At step 110, the task analyzer 72 determines if the task is a type 0 task. A type 0 task is a task in which all of the software resources required to perform the task are unique and, therefore, a copy of each software resource is required. Conversely, a type 1 task requires two or more of the same software resource, as well as other software resources. In that case, consolidation of type 1 software resources, described subsequently, may be possible.

Still referring to FIG. 8, if the task is a type 0 task, step 110 branches to step 112 where the task analyzer 72 determines if there are sufficient software resources to perform the task. Step 112 is equivalent to step 90 (FIG. 9). If sufficient software resources are not available, step 112 branches to step 114 and moves the task onto the on-hold queue 74 for subsequent processing. However, if there are sufficient software resources to perform the type 0 task, step 112 instead to branches to step 116 which moves the task to the processed queue 106. Step 114 then proceeds to step 116 which updates the resource table of available software resources in the same fashion as step 108 (FIG. 9). Step 116 then proceeds to step 118 and determines if the raw queue is empty. If so, step 18 exits the task analyzer software at step 20. Conversely, if the raw queue is not empty, step 118 branches back to step 86 where the above process is repeated.

Figure 10:
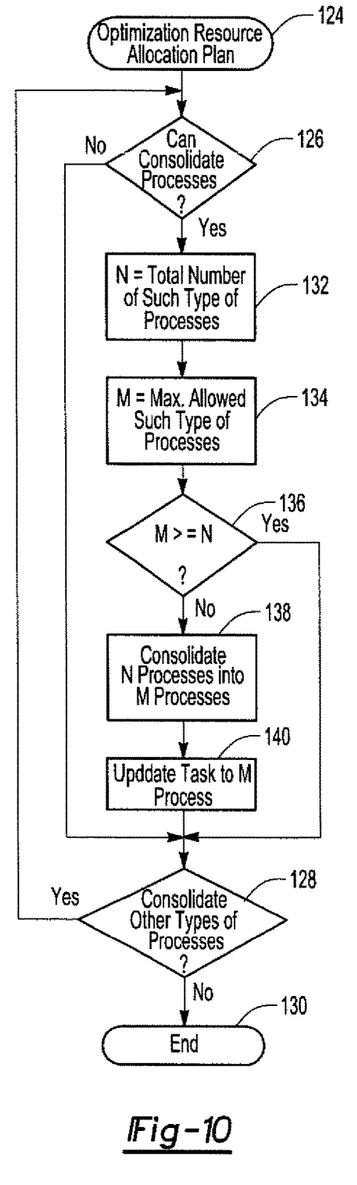
FIG. 10 is a flowchart of resource allocation plan optimization.

Referring now to FIGS. 8 and 10, if the task is a type 1 task, i.e. it utilizes multiple copies of at least one software resource, step 110 proceeds to step 122 where the software resource allocations are optimized for type 1 tasks. A flowchart illustrating the optimization of the software resource allocation is shown in FIG. 10.

Referring then to FIG. 10, after initiation at step 124, step 124 proceeds to step 126. At step 126, the task is examined to determine if its requirement on multiple copies of a particular software resource can be consolidated by combing the processes that require the same type of software resource. If not, step 126 branches to step 128 and determines if there are other types of software resources required by the task. If so, step 128 branches to step 126. If not, step 128 exits at step 130.

However, if the process or software resource can be consolidated, step 126 instead proceeds to step 132 where the total number of software resources of that particular type required by the task are determined. Step 132 then proceeds to step 134. At step 134, maximum number of software resources of that type is determined by querying the software database 94 (FIG. 5). Step 134 then proceeds to step 136.

At step 136, if the number M of available resources of that type is equal to or greater than the number N of that type of resource required by the particular task, there is no need for consolidation. As such, step 136 branches to step 128 and continues iteratively until all of the required processes for the task are examined.

However, if the number N of a particular type of software resource exceeds the number M of available copies of that type of software resource, consolidation is necessary and step 136 branches to step 138. At step 138, N processes are consolidated into M processes, i.e. the number of software resources of a particular type required by the task are consolidated into the number of available software resources.

Figure 11:
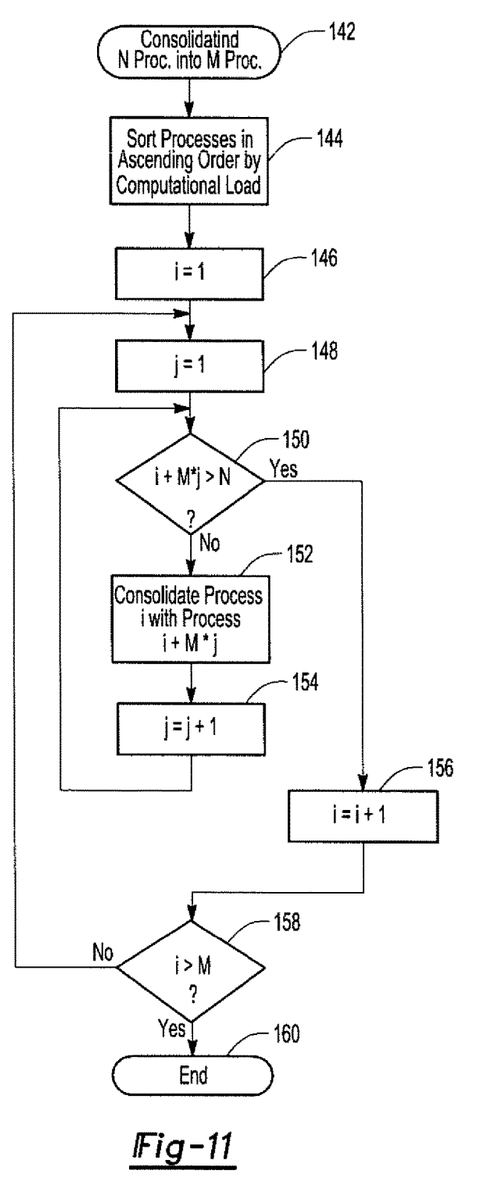
FIG. 11 is a flowchart of process consolidation.

A consolidation method is shown in FIG. 11 which is initiated at step 142. Step 142 proceeds to step 144. Step 144 first sorts the software resources by computational load. This sorting is advantageous in order to distribute the computational workload of the task as evenly as possible over multiple processors. Once sorted, step 144 proceeds to step 146.

At step 146, an index i is set to 1 and step 146 proceeds to step 148. At step 148, a dummy variable j is also set to 1. 148 then proceeds to step 150.

At step 150, index i is added to the product of dummy variable j multiplied by the number of available licenses M and compared to the number N of software resources required to perform the task. If greater than the number of required software resources, step 150 branches to step 152 and consolidates the process at index i with the process at index i+M×j. Step 152 then proceeds to step 154 which increments the dummy variable j and proceeds to back to step 150 where the above process is repeated.

Conversely, if the sum of the index i and the product of the number of available software resources multiplied by the dummy variable j exceeds the number N of required software resources to perform the task, step 150 instead branches to step 156 where the index i is incremented. Step 156 then proceeds to step 158 where the index i is compared to the number M of available software resources. If greater, the consolidation is finished and step 158 proceeds to step 160 and exits the consolidation program. Otherwise, step 158 branches back to step 148 and the above process is repeated.

With reference again to FIG. 10, after consolidation of the software resources at step 138, step 138 proceeds to step 140 and updates the task info mentioning that this task now only requires M processes and therefore only requires M copies of such software resources.

Figure 14A:
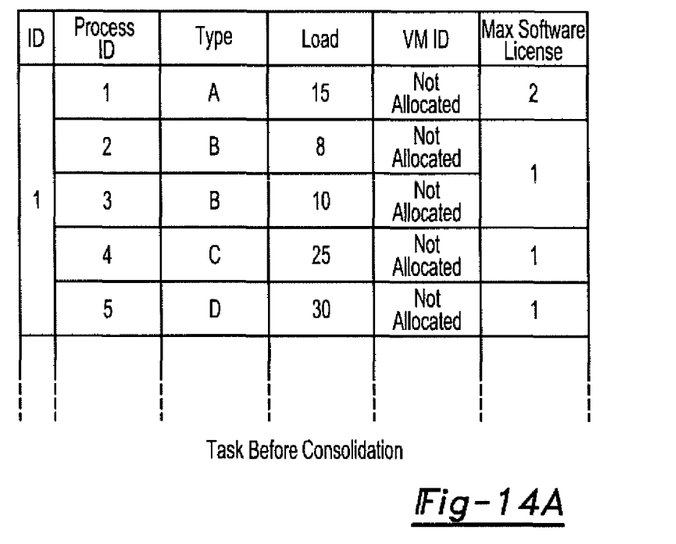
FIGS. 14A and 14B are examples of consolidating tables both before and after consolidation for a task.
Figure 14B:
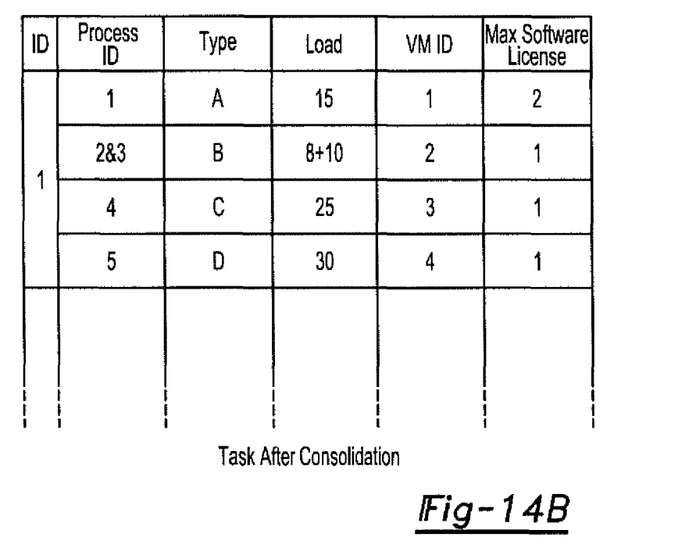

FIGS. 14A and 14B illustrate an exemplary task both before consolidation (FIG. 14A) and after consolidation (FIG. 14B). In this example, a type 1 process includes two type B processes but only one license is available. Consequently, in order to permit the task to be executed, the two type B processes are consolidated together as shown in FIG. 14B so that only a single license is required. Following consolidation, the task may be performed with the proper number of licenses.

Referring again to FIG. 8, after optimization of the software resources at step 122, the task is moved to the process queue 106 (FIG. 1) and the resource table 116 is updated.

Figure 15A:
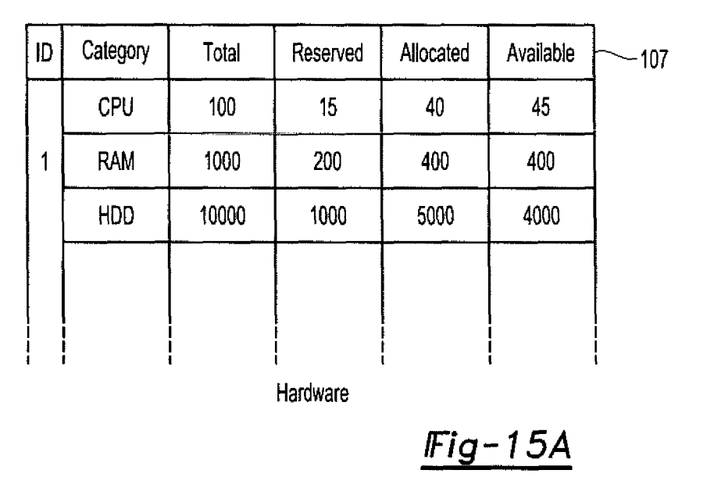
FIG. 15A is an example of a hardware resource table.
Figure 15B:
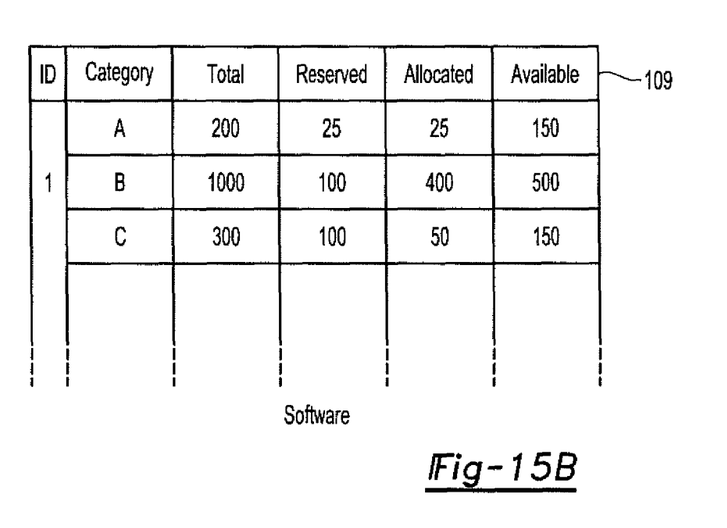
FIG. 15B is an example of a software resource table.

With reference now to FIGS. 15A and 15B, exemplary resource tables 107 (FIG. 15A) and 109 (FIG. 15B) are shown. FIG. 15A is directed to hardware resources while FIG. 15B is directed to software resources.

For example, as shown in FIG. 15A, the total CPU power is known and the resource table 107 maintains the amount of CPU power that has been reserved as well as allocated so that the amount of available CPU power for other tasks may be computed. The same is true for random access memory as well as persistent memory such as a hard disk drive (HDD).

With reference now to FIG. 15B, a resource table 109 for the software is also illustrated. The software resource table 109 includes the various categories A, B, C, . . . of different software packages as well as the total number of each category of software that is available to the system. The software resource table also maintains an accounting of the reserved software as well as allocated software for each category so that the available software is computed by subtracting the reserved and allocated software from the total software available for each category.

Figure 6:
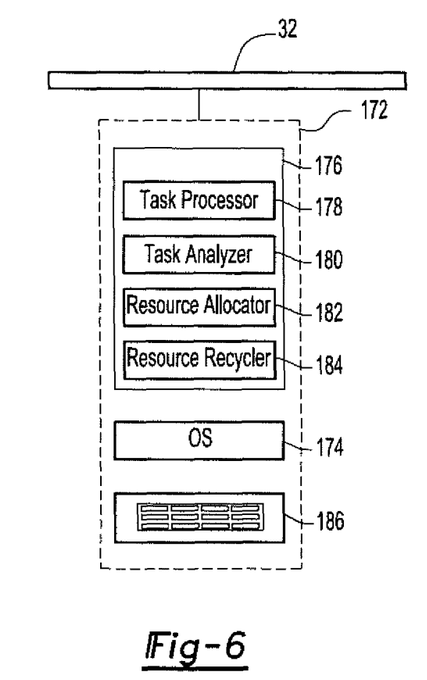
FIG. 6 is a block diagram of the resource management server.
Figure 12:
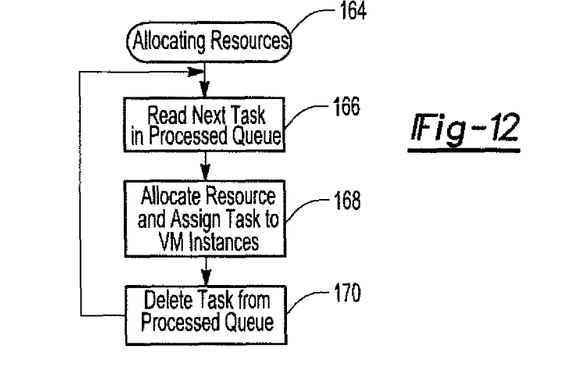
FIG. 12 is a flowchart of virtual resources allocation.

With reference now to FIGS. 1, 6, and 12, the appropriate software and hardware resources must be allocated in order to perform the next task in the processed queue 106. Consequently, a resource allocator 162 must allocate and assign both hardware and software.

The operation of the resource allocator 162 is shown in FIG. 12 and, after initiation at step 164, step 164 proceeds to step 166 where the next task from the process queue 106 is inputted or read in. Step 166 then proceeds to step 168 where the resource allocator 162 communicates with a resource management server 172 to allocate both hardware and software to the task. The allocated hardware and software together constructs a server as in system 54 and is added to fleet 194 in FIG. 1. The resource management server 172 includes an operating system 174 as well as a management application 176 that operates under the operating system 174. The management application 176, furthermore, includes a task processor program 178 and task analyzer program 180. A resource allocator program 182 and resource recycler program 184 are also contained within the management application 176. A dedicated server 186 performs the communication with the network 32.

Figure 4:
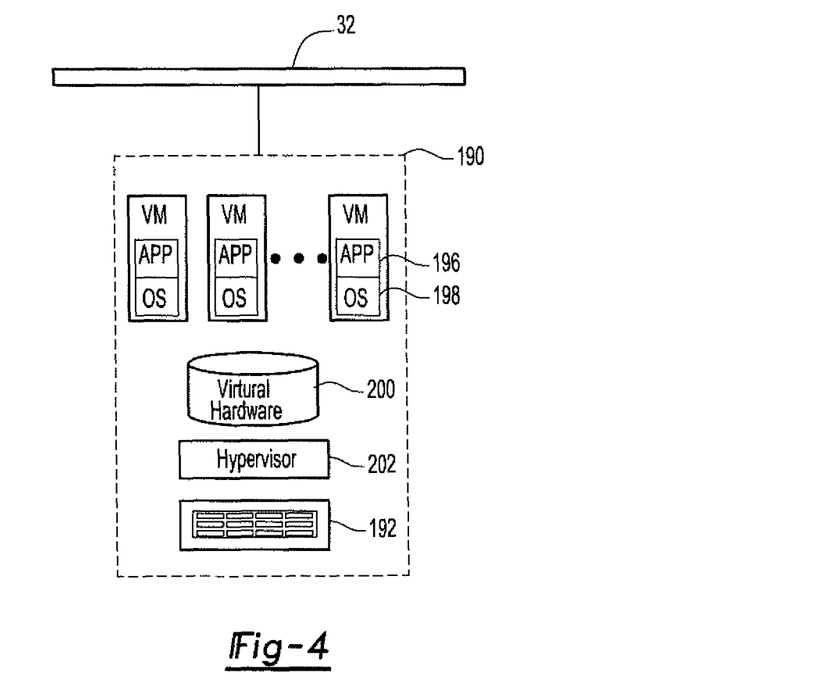
FIG. 4 is a block diagram of the virtual hardware resource server.

With reference to FIG. 4, an exemplary virtual hardware server system 190 which communicates with the network 32 through its server 192. The virtual hardware system 190 may construct a part of a fleet 194 (FIG. 1) of virtual servers for executing user submitted jobs. Each virtual server in the fleet 194 includes operating applications 196 operating under the control of an operating system 198. All required software resources are included in operating applications 196. The virtual hardware system 190 relies on a hypervisor (a special computer operating system/software that can provide virtual hardware 200 using physical hardware in server 192).

With reference again to FIGS. 4 and 12, once the virtual servers on top of the virtual hardware resource server 190 (as well as in fleet 194) have been allocated at step 168 by the resource allocator 162, the necessary software resources to perform the task are loaded into the virtual server and executed. Step 168 then proceeds to step 170 where the now processed task is deleted from the processed queue 106.

Figure 13:
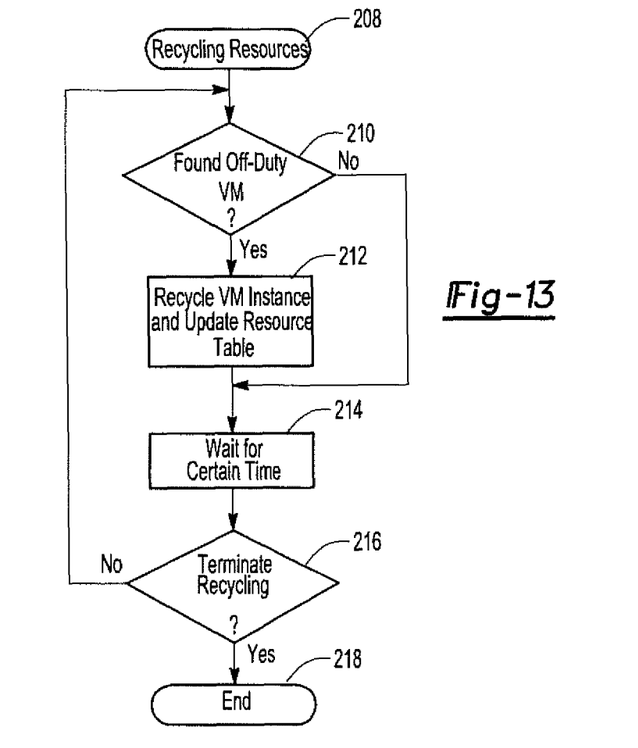
FIG. 13 is a flowchart of virtual machine recycling.

With reference now to FIGS. 1 and 13, upon completion of the task, a resource recycler 204 recycles the software resources back into the software database 92 and also recycles the virtual machine into a hardware database 206. The operation of the resource recycler 204 is illustrated in FIG. 13.

With reference now to FIG. 13, after initiation at step 208, step 208 proceeds to step 210. At step 210, the resource recycler 204 attempts to locate an off duty virtual server as in server fleet 194 in FIG. 1. If an off duty virtual server is found, step 210 proceeds to step 212 where the databases 206 and 92 for the hardware and software are updated. Step 212 then proceeds to step 214 where a time delay occurs. After the expiration of the time delay, step 214 proceeds to step 216 and determines if recycling should be terminated. If not, step 216 proceeds back to step 210 and the above process is repeated. Otherwise, step 216 branches to step 218 and terminates the recycling program.

In the event that an off duty virtual server is not located at step 210, no virtual servers are available for recycling. Consequently, step 210 instead branches to step 214 and the above process is repeated.

From the foregoing, it can be seen that the present invention provides an effective method and system for allocating software resources. Having described our invention, however, many modifications thereto will become apparent to those skilled in the art to which it pertains without deviation from the spirit of the invention as defined by the scope of the appended claims.

The invention claimed is:

1. A method for allocating software resources, the method comprising:
receiving, by a server system including one or more processors, from a computer network accessible by a plurality of different users, a task representing a simulation of a physical system, the task including a plurality of processes, each respective process requiring a respective type of software package of a plurality of software packages for executing the respective process of the plurality of processes, wherein the server system is configured with a plurality of virtual servers for executing the plurality of processes of the task,
analyzing the received task to determine which of the plurality of software packages are required to perform each of the respective processes of the task on one or more of the virtual servers,
sending a request to a software resource server that accesses a software allocation data structure for determining an availability of respective ones of the software packages; and
based on determining that a first process and a second process of the plurality of software processes require a same type of a first software package, and further based on determining, from the software resource server, that only one instance of the first software package is available, consolidating the first process and the second process as a consolidated process;
allocating the respective processes and the respective software packages, including the consolidated process and the first software package, to one or more of the virtual servers that execute the plurality of processes to execute the task and perform the simulation of the physical system,
wherein the software resource server is configured to access the software allocation data structure to determine availability of respective ones of the software packages, the software allocation data structure containing data representative of a number and identity of the software packages available to the server system; and
updating the software allocation data structure upon completion of each process of the task to indicate that the respective software package is available.

2. The method as defined in claim 1 wherein the received task is stored in a raw queue prior to analyzing the received task.

3. The method as defined in claim 1, further comprising, if one or more required software packages are temporarily unavailable, storing the task in an on-hold queue for a period of time and thereafter determining whether the one or more temporarily unavailable software packages have become available.

4. A system for allocating software resources, the system comprising:
one or more processors; and
a memory storing instructions which, when executed by the one or more processors of the system, configure the one or more processors to:
receive, from a computer network accessible by a plurality of computers, a task representing a simulation of a physical system, the task including a plurality of processes, each respective process requiring a respective type of software package of a plurality of software packages for executing the respective process of the plurality of processes, wherein the system is configured with a plurality of virtual servers for executing the plurality of processes of the task,
analyze the received task to determine the types of the software packages required to execute each of the respective processes;
determine an availability of respective ones of the software packages based on data in a software allocation data structure;
based on determining that a first process and a second process of the plurality of software processes require a same first software package, and further based on determining, from the software allocation data structure, that only one instance of the first software package is available, consolidate the first process and the second process as a consolidated process; and
allocate the respective processes and the respective software packages, including the consolidated process and the first software package, to one or more of the virtual servers that execute the plurality of processes for executing the task and performing the simulation of the physical system,
wherein the one or more processors are configured to access the software allocation data structure to determine availability of respective ones of the software packages, the software allocation data structure containing data representative of a number and the type of the software packages available to the server system; and
update the software allocation data structure upon completion of each process of the task to indicate that the respective software package is available.

5. The system as defined in claim 4 wherein the one or more processors are further configured to store the received task in a raw queue prior to analyzing the received task.

6. The system as defined in claim 4 wherein if one or more required software packages are temporarily unavailable, the one or more processors are configured to store the task in an on-hold queue for a period of time and thereafter determine whether the one or more temporarily unavailable software packages have become available.

* * * * *